US010676007B2

(12) United States Patent
Clement

(10) Patent No.: US 10,676,007 B2
(45) Date of Patent: Jun. 9, 2020

(54) PORTABLE LIFT DEVICE, SYSTEM, AND METHOD

(71) Applicant: CHURCH STEWARDSHIP INC., Rifton, NY (US)

(72) Inventor: Gideon M. Clement, Rifton, NY (US)

(73) Assignee: CHURCH STEWARDSHIP INC., Rifton, NY (US)

( * ) Notice: Subject to any disclaimer, the term of this patent is extended or adjusted under 35 U.S.C. 154(b) by 60 days.

(21) Appl. No.: 15/736,549

(22) PCT Filed: Jul. 21, 2016

(86) PCT No.: PCT/US2016/043310
§ 371 (c)(1),
(2) Date: Dec. 14, 2017

(87) PCT Pub. No.: WO2017/015446
PCT Pub. Date: Jan. 26, 2017

(65) Prior Publication Data
US 2018/0186271 A1    Jul. 5, 2018

Related U.S. Application Data

(60) Provisional application No. 62/195,920, filed on Jul. 23, 2015.

(51) Int. Cl.
*B60P 1/44* (2006.01)
*A61G 3/06* (2006.01)

(52) U.S. Cl.
CPC ............ *B60P 1/4421* (2013.01); *A61G 3/063* (2013.01); *B60P 1/4485* (2013.01); *B60P 1/44* (2013.01); *B60P 1/4492* (2013.01)

(58) Field of Classification Search
CPC .................................. A61G 3/062; B60P 1/44
See application file for complete search history.

(56) References Cited

U.S. PATENT DOCUMENTS 4,133,437 A    1/1979    Gates
4,551,060 A    11/1985   Quercy
(Continued)

OTHER PUBLICATIONS

International Search Report dated Dec. 2, 2016 in International Application No. PCT/US2016/043310.
(Continued)

*Primary Examiner* — Saul Rodriguez
*Assistant Examiner* — Willie Berry, Jr.
(74) *Attorney, Agent, or Firm* — Baker Botts L.L.P.

(57) ABSTRACT

A portable lift device that includes a portable lift column assembly having a lift column including a first end, a second end, and a length there between. The second end of the lift column has at least one column attachment system. The lift column assembly further includes a riser assembly coupled to the lift column and movable with respect to the lift column. The riser assembly includes a riser attachment device. The portable lift device also includes a platform assembly movable with the riser assembly and having a platform structure coupled to at least one platform attachment system. The at least one platform attachment-system selectively engages the riser attachment device to detachably couple the platform assembly with the riser assembly and wherein the platform structure maintains structural integrity under a predetermined load capacity. The platform assembly is movable with the riser assembly.

20 Claims, 8 Drawing Sheets

(56) References Cited

U.S. PATENT DOCUMENTS

| | | | |
|---|---|---|---|
| 5,149,246 | A | 9/1992 | Dorn |
| 5,553,990 | A | 9/1996 | Kytola, Sr. |
| 2005/0002769 | A1 | 1/2005 | Scheibel |
| 2010/0038181 | A1* | 2/2010 | Jones ........................ B66F 7/20 187/243 |
| 2014/0261101 | A1* | 9/2014 | Hurd ..................... A47B 97/00 108/50.11 |

OTHER PUBLICATIONS

Centerspan Medical. Harmar Auto List Installation. Youtube. Feb. 9, 2015.—[Accessed on Apr. 20, 2018]. Retrieved from the internet: <URL: https://www.youtube.com/watch?v=TTd_KrluVbQ> entire video.

Raalloy Ramps. Air-stairs carried with the aircraft. Youtube. Sep. 20, 2012. [Accessed on Apr. 20, 2018]. Retrieved from the internet: <URL: https://www.youtube.com/watch?v=sd4ejN-JsjY> entire video.

* cited by examiner

PORTABLE LIFT DEVICE, SYSTEM, AND METHOD

CROSS REFERENCE TO RELATED APPLICATION

The present application is a U.S. National Stage patent application under 35 U.S.C. § 371 of International Application No. PCT/US2016/043310, filed on Jul. 21, 2016, which claims the benefit of U.S. Provisional Application No. 62/195,920 filed on Jul. 23, 2015, the contents of each of which are incorporated herein by reference in their entirety.

BACKGROUND OF THE DISCLOSED SUBJECT MATTER

Field of the Disclosed Subject Matter

The presently disclosed subject matter relates generally to a portable lifting device and more specifically to a portable lifting device that can be quickly coupled to a desired apparatus to facilitate quick movement of loads between a first position and a second position positioned above or below the first position.

Background

Portable, lightweight lifting devices are not commonly known to quickly and easily transfer an article from a first position to a second position. In one application involving wheelchair access to vehicles such as a small plane, specialized ground service equipment, forklifts and the like are commonly used to permit individuals in wheelchairs to board such planes. Such equipment is difficult or impossible to obtain at many locations, and can be dangerous and undignified for the passenger in the wheelchair. As such, current systems to provide elevated access to any location have many shortcomings.

For example, wheelchair lift technology is rarely implemented in small aircraft. Even for larger aircrafts, such lift technology is often heavy, cumbersome, and takes up significant space. In these large aircrafts, lifts are almost always structurally integrated into the aircrafts themselves, requiring permanent or semi-permanent modification of the aircraft structure. The United States Federal Aviation Administration (FAA) requires certain certification standards be met for any structural modification of an aircraft, which makes any such installation very expensive and difficult. In fact, current lift devices of this nature, such as wheelchair lift systems installed in corporate jet aircraft, are known to weigh in excess of 500 pounds and can cost more than $500,000. For small aircraft that are not manufactured with a system to provide wheelchair access, makeshift and undignified systems are sometimes employed, such as the use of a forklift. Portable, detachable lift devices are desirable because they may not require approval of the FAA, as such devices do not involve modification of or permanent installation in the aircraft. In the car and van industry, lift devices for applications such as wheelchairs are likewise heavy, cumbersome and take up a significant amount of space. A portable, detachable lift device is likewise needed in many industries.

A lift device and system that overcomes at least the above issues is desirable for a plurality of fields, such as for purposes of example the aircraft industry and vehicle industry. Efficient and portable lift technology for a plurality of applications is needed. There thus remains a continued need for an efficient and economic system for portable lifting devices. The presently disclosed subject matter satisfies these and other needs.

SUMMARY OF THE DISCLOSED SUBJECT MATTER

The purpose and advantages of the disclosed subject matter will be set forth in and are apparent from the description that follows, and will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a portable lift device comprising a portable lift column assembly having a lift column including a first end, a second end, and a length therebetween. The second end of the lift column has at least one column attachment system. The lift column assembly further includes a riser assembly coupled to the lift column and movable with respect to the lift column. The riser assembly includes a riser attachment device. The portable lift device also includes a platform assembly movable with the riser assembly and having a platform structure coupled to at least one platform attachment system. The at least one platform attachment system selectively engages the riser attachment device to detachably couple the platform assembly with the riser assembly, wherein the platform structure maintains structural integrity under a predetermined load capacity. The portable lift device moves the platform assembly under the predetermined load capacity from a first position to a second position.

In accordance with another aspect of the disclosed subject matter, a portable lift device system is provided, comprising, amongst other things the portable lift device as described above and an apparatus, wherein the column attachment system is selectively secured with the apparatus and the portable lift device moves the platform assembly under the predetermined load capacity from a first position to a second position.

In accordance with another aspect of the disclosed subject matter, a method of using a portable lift device assembly is provided. The method comprising, amongst other things, providing a portable column assembly having a lift column including a first end, a second end, and a length therebetween, the second end of the lift column having at least one column attachment system, and a riser assembly coupled to the lift column and movable with respect to the lift column, the riser assembly including a riser attachment device; selectively securing the portable column assembly with an apparatus; selectively coupling a platform assembly to the riser assembly, wherein the platform assembly is selectively movable with the riser assembly, the platform assembly having a platform structure coupled to at least one platform attachment system, wherein the platform structure maintains structural integrity under a predetermined load capacity, the at least one platform attachment system selectively engages the riser attachment device to detachably couple the platform assembly with the riser assembly; and selectively moving the riser assembly and platform assembly between a first position to a second position.

It is to be understood that both the foregoing general description and the following detailed description with reference to the drawings are examples and are provided for purpose of illustration and not intended to limit the scope of the disclosed subject matter in any manner. The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to embodiments of the disclosed subject matter, examples of which are illustrated in the accompanying drawings. The disclosed subject matter will be described in conjunction with the detailed description of the device and system.

In accordance with the disclosed subject matter, a portable lift device is described comprising a portable lift column assembly having a lift column including a first end, a second end, and a length therebetween. The second end of the lift column has at least one column attachment system. The lift column assembly further includes a riser assembly coupled to the lift column and movable with respect to the lift column. The riser assembly includes a riser attachment device. The portable lift device also includes a platform assembly movable with the riser assembly and having a platform structure coupled to at least one platform attachment system. The at least one platform attachment system selectively engages the riser attachment device to detachably couple the platform assembly with the riser assembly, wherein the platform structure maintains structural integrity under a predetermined load capacity. The portable lift device moves the platform assembly under the predetermined load capacity from a first position to a second position.

Figure 1:
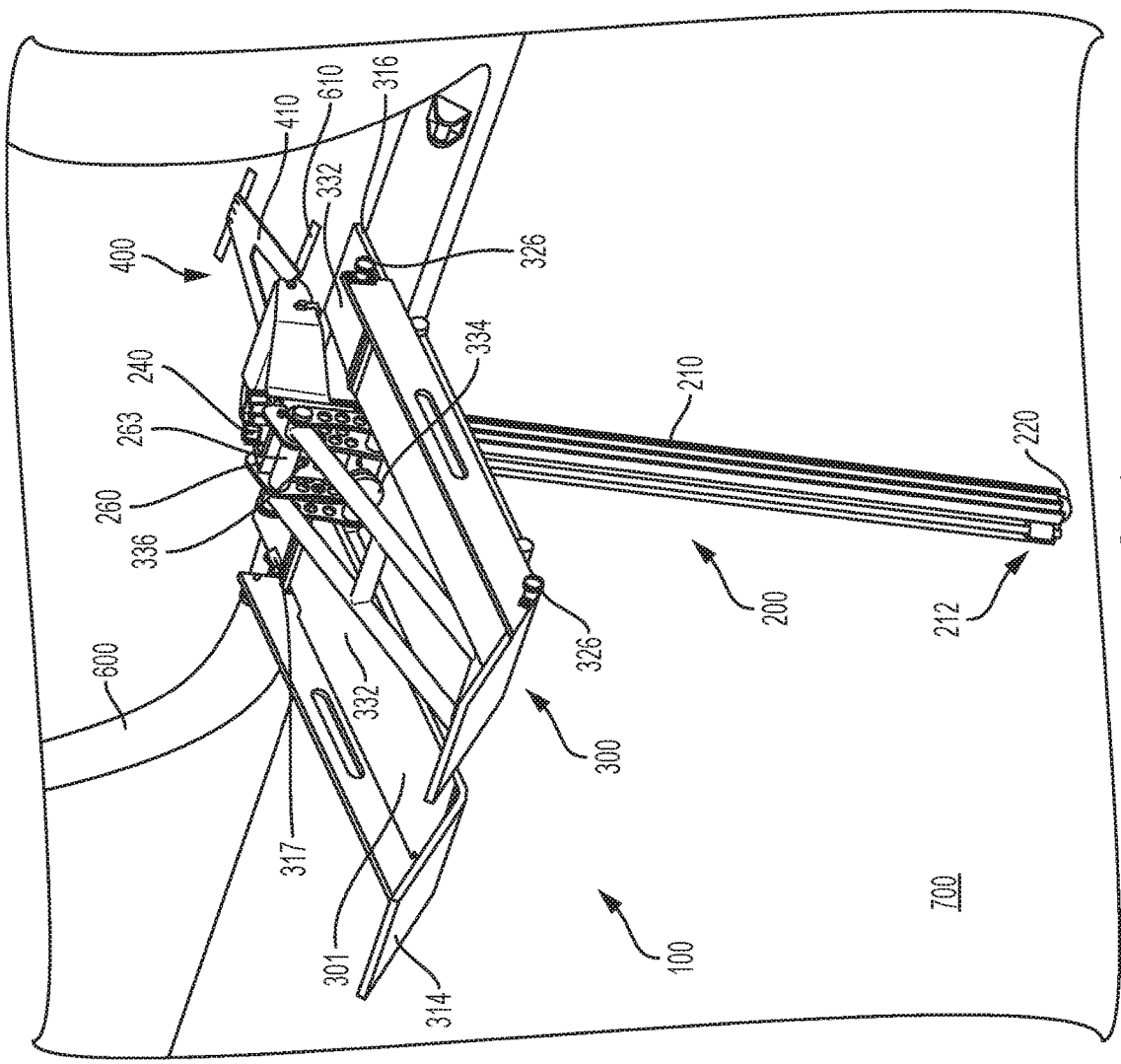
FIG. 1 is a perspective view of a portable lift device coupled to an aircraft apparatus, according to an embodiment of the disclosed subject matter.

Solely for purpose of illustration, an example embodiment of a portable lift device, system and method is shown schematically in FIG. 1. It is understood that the examples herein are not intended to limit the scope of the disclosed subject matter in any manner. Particularly, and as illustrated, the portable lift device 100 is detachably coupled to an apparatus 600, such as an aircraft as depicted in FIG. 1. The lift device 100 comprises a portable lift column assembly 200, a platform assembly 300, and optionally an interface assembly 400 that are each respectively portable and detachable with respect to each other. Although the interface assembly 400 is shown in the figures, the interface assembly is optional as the lift device can be coupled to a suitable apparatus directly, as further discussed below. In another embodiment of the portable lift device, the portable lift device 100 is detachably coupled to the interior of the apparatus 600 and the portable lift column assembly 200 extends through an opening in the apparatus.

Figure 2:
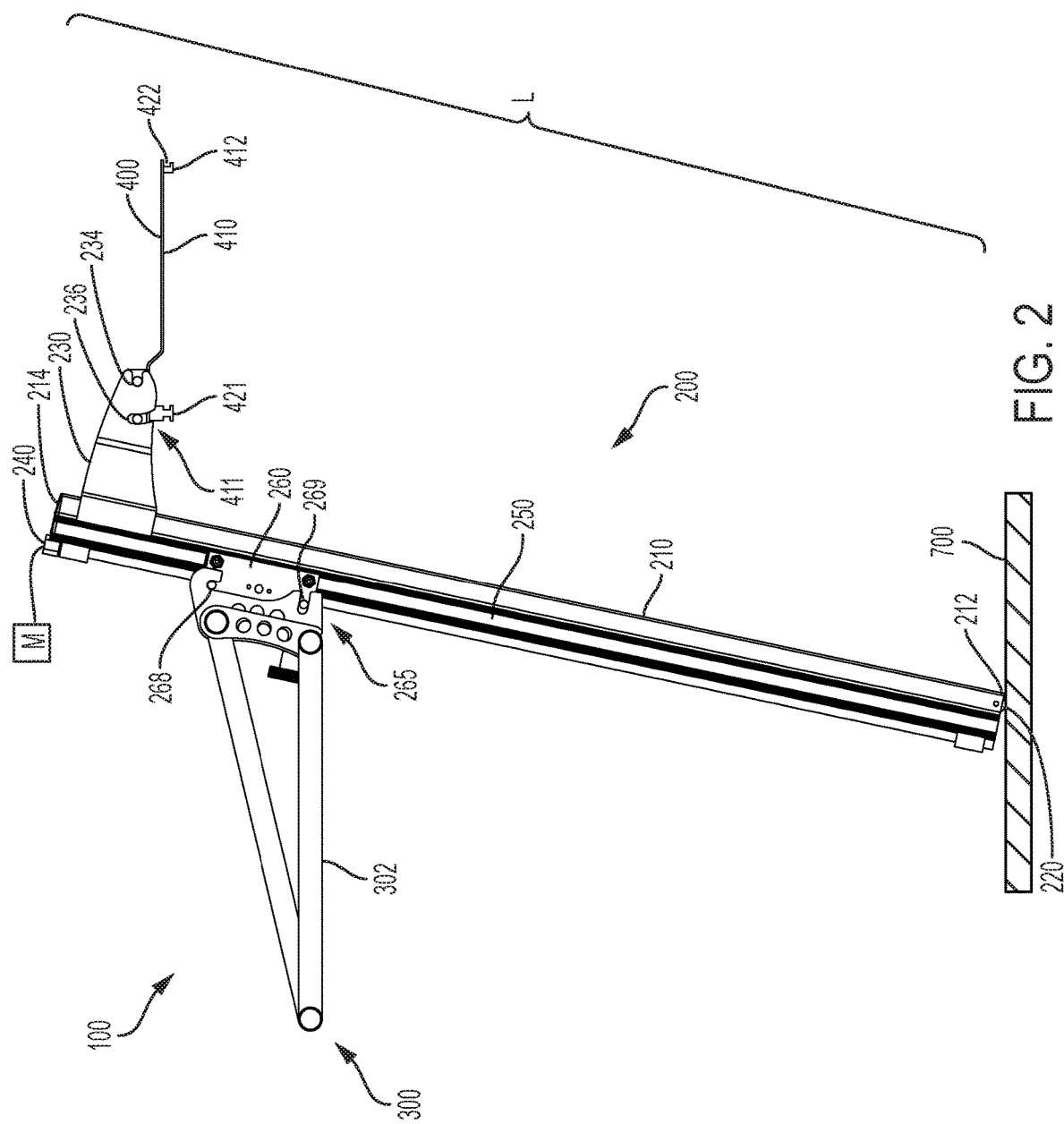
FIG. 2 is a side view of the platform assembly coupled to the lift column assembly, according to an embodiment of the disclosed subject matter.

FIG. 2 is a side view of the lift column assembly 200 coupled with the platform assembly 300, according to an embodiment of the disclosed subject matter. As shown, the portable lift column assembly 200 has a lift column 210 including a first end 212, a second end 214, and a length L therebetween. The length L can be any suitable dimension that permits the interface assembly 400 to be secured to the apparatus 600, while permitting the first end 212 of the lift column to securely rest upon a foundation 700 and be able to withstand a predetermined load capacity and force. For example, the length L can have a dimension up to and including approximately 10 feet. For purposes of example, the length L of the lift column 210 of FIG. 1 is approximately 4.5 feet. However, the length L can be manufactured to accommodate for specific heights and uses with any suitable apparatus 600.

The lift column assembly 200 and the platform assembly 300 maintain structural integrity under a predetermined load capacity. In one embodiment, the predetermined load capacity can range and include up to and including approximately 1500 pounds for use with one lift column, and in one embodiment approximately 750 pounds. Other load capacities are contemplated herein. Although the lift column assembly 200 of FIG. 1 depicts solely one lift column 210, the lift column assembly can include more than one lift column, as contemplated herein. With the addition of subsequent lift columns for the portable lift device, the maximum predetermined load that the lift column assembly 200 can at least double in load capacity.

With the loading of certain apparatuses such as aircrafts, the aircraft fuselage can vertically shift in height, for example by a few inches for a small Pilatus aircraft, particularly as the landing gear shock absorption systems and tires compress as the aircraft is loaded with passengers, fuel, cargo, or the like. To accommodate for at least such movement, the first end 212 of the lift column can have an adjustment device 220 to permit the first end of the column to adjust position toward or away from the aircraft to compensate for different heights of the aircraft during use of the lift device. As such, if the aircraft suddenly increases in height due to certain pressures or loads, the angle of the lift column can adjust more acutely with respect to the infrastructure upon which the interface assembly 400 rests. Conversely, if the aircraft suddenly decreases in height due to certain loads, the angle of the lift column can adjust more obtusely with respect to the infrastructure upon which the interface assembly 400 rests. Such adjustment prevents compressive loading from being applied to the column and attachment systems and prevents the column and attachment systems from carrying a portion of the weight of an aircraft, vehicle or apparatus to which it is attached.

In an embodiment of the disclosed subject matter, the adjustment device 220 of the lift column includes a roller to allow the lift column 210 to adjust position upon the surface 700 on which it rests, or to adjust the angle of the column with respect to the interface assembly 400 for given uses of the device with various apparatuses. Alternatively, the roller can be selectively positioned as locked or unlocked to prevent or to permit movement of the lift column 210, respectively. The adjustment device 220 can include a plurality of suitable surfaces such as, but not limited to a skid surface.

As depicted in FIG. 2, the second end 214 of the lift column has at least one column attachment system 230. The column attachment system can be any suitable attachment system, such as but not limited to a plate 230. In such embodiment, the at least one column plate 230 defines a first recess 234 and a second recess 236 distanced therefrom that each respectively engage with the interface assembly 400, as further described herein. The lift column 210 further includes a driver interface nut 240 that is coupled to a threaded rotatable rod 244 extending the length of the lift column and rotatably attached to the lift column. In an embodiment, the threaded rotatable rod is rotatably attached to the lift column by at least one bearing or bushing. The driver interface nut can include any suitable nut or device, such as but not limited to hex nut, socket or a gear. The driver interface nut 240 and the rotatable rod 244 are coupled such that any rotation imparted on the nut 240 will similarly impart to the rod 244 causing the rod to rotate. At least one channel 250 is adjacent the rod 244 in the lift column and extends the length of the lift column.

Figure 3:
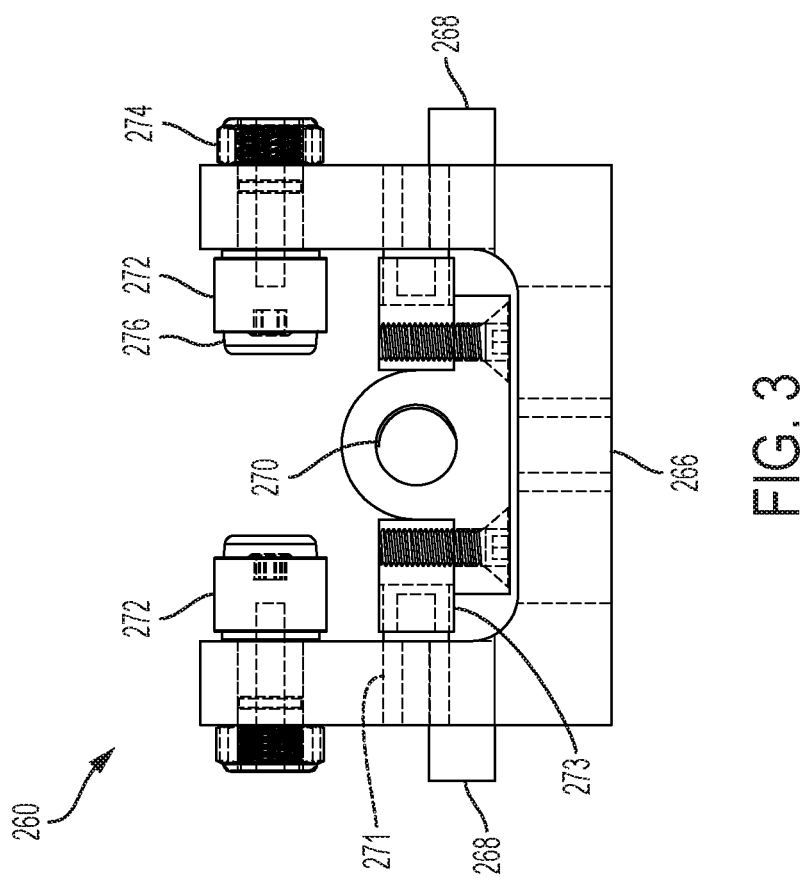
FIG. 3 is a top view of the riser assembly, according to an embodiment of the disclosed subject matter.

As shown in FIG. 1 and FIG. 2, the riser assembly 260 is coupled to the lift column 212 and is movable with respect to the lift column 212. The riser assembly 260 includes a riser attachment device 265 to engage with the platform assembly 300, as further described herein. The attachment device 265 includes a chassis 266 that has any suitable shape, such as for example a U-shape. FIG. 3 is a top view of the riser assembly showing a chassis with the U-shape design according to an embodiment of the disclosed subject matter. The attachment device 265 further includes at least a first riser pin 268 and a second riser pin 269 distanced from the first riser pin, as shown in FIG. 2 and FIG. 3. The chassis of the riser assembly 260 further includes at least one threaded nut assembly 270 defining a threaded recess, a load transfer bolt 271, and a load transfer block 273. The load transfer block and load transfer bolt transfer load between the threaded nut and the riser chassis. In one embodiment, the threaded nut assembly 270 includes but is not limited to at least one of an acme nut and a ball nut.

As shown in FIG. 3, the riser assembly further includes at least one guide device 272. The guide device can comprise any suitable device such as but not limited to a track roller. The track roller can be coupled to the chassis by a track roller attachment nut 274 and further include a track roller bushing 276. In the embodiments of FIG. 1-3, the guide device includes four track rollers with respective track roller attachment nuts and track roller bushings, but any number of roller devices is contemplated herewith. For example, in certain applications the guide device can include two track rollers. In the embodiment of FIG. 3, two track rollers are disposed parallel on one side of the U-shape chassis and the other two track rollers are disposed parallel on the opposite side of the U-shape chassis. Each pair of rollers cooperates with respective channels of the lift column 212, as noted below. In other embodiments, the guide device comprises at least one pin. In another embodiment, the guide device includes at least one pin and at least one track roller. In further embodiments, the guide device includes a series of low-friction bushings, such as but not limited to plastic or metallic bushings.

As noted above, the riser assembly 260 is coupled to the lift column 212 and movable with respect to the lift column 212. In the embodiment of FIG. 1, once the riser assembly is assembled with the lift column, the riser assembly and the lift column are not separable. However, other embodiments contemplate the riser assembly being separable from the lift column. The at least one threaded nut assembly 270 of the riser assembly that defines the recess receives the threaded rotatable rod 244 therein. Furthermore, the at least one guide device 272 such as the track roller is housed within the at least one channel of the lift column and moves along the channel along the length thereof. As such, as the threaded rotatable rod 244 rotates within the recess of the riser nut assembly, the riser assembly attached thereto moves axially along the length of the rod and along the length L of the lift column. Depending on the direction of rotation of the rod, the riser assembly will either ascend or descend relative to the first end of the lift column. As such, engagement of the at least one threaded nut assembly 270 and the threaded rotatable rod 244 moves the riser assembly 260 with respect to the lift column 200.

Figure 5:
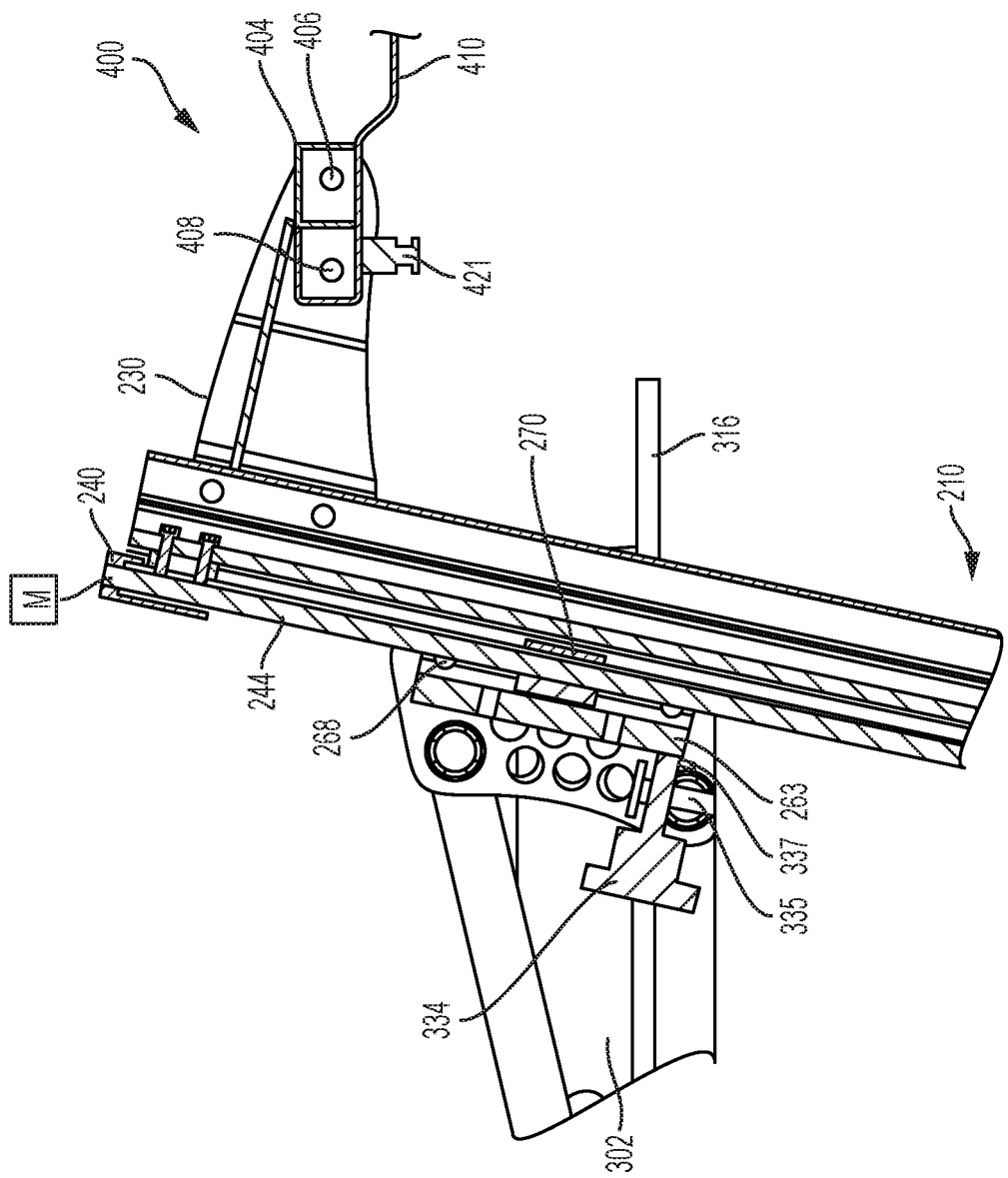
FIG. 5 is a cross-sectional side view of the lift column assembly and platform assembly of FIG. 4 about lines A-A, according to an embodiment of the disclosed subject matter.
Figure 4:
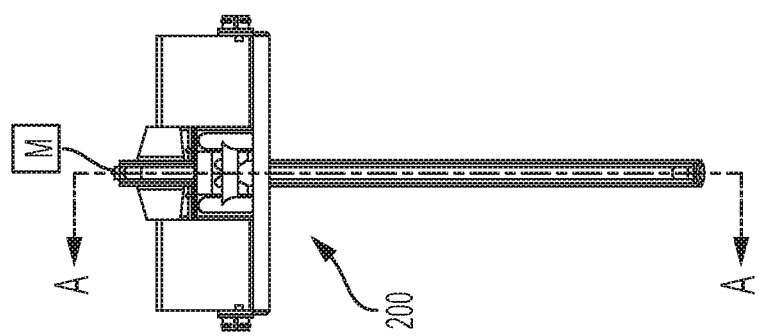
FIG. 4 is a front view of the lift column assembly coupled with the platform assembly, according to an embodiment of the disclosed subject matter.

FIG. 4 is a front view of the lift column assembly 200 coupled with the platform assembly 300 and FIG. 5 is a side view of FIG. 4 about line A-A, according to an embodiment of the disclosed subject matter. As shown in these figures, the driver interface nut 240 together with the rotatable rod 244 can be coupled to a motor M to rotate the nut and rod. The motor M can drive the driver interface nut to rotate the threaded rotatable rod. Since the threaded nut assembly 270 of the riser assembly is threadably engaged with the rotatable rod 244, the riser assembly can be selectively moved with respect to the lift column upon rotation of the rotatable rod 244. It is noted that the motor M can be coupled to the lift device in a number of suitable manners. Furthermore, the motor can be integral with the lift column assembly or can be a separable or detachable structure. In one embodiment, the motor is a power drill that has an attachment that is complementary to the driver interface nut 240. In another embodiment, the motor is a hand crank that is manually operated. In another application, the motor is a separate device that wirelessly controls the portable lift device and can be operated by a computer device, such as a handheld smartphone. In one embodiment, the riser assembly can move from a first position at the first end of the lift column to a second position at the second end of the lift column in approximately 18 seconds. In further embodiments, the motor is coupled to the threaded rotatable rod by at least one of an intermeshing gear, a chain and sprocket mechanism, a belt and pulley mechanism, a torque limiter, and the like. In an embodiment, the column is fitted with sensors to detect position of the riser assembly with respect to the length of the lift column. As such, position sensors can detect arrival of the riser assembly at an end of the column, and send a stop signal to the motor. In a further embodiment, a computerized control system can command the motor speed of the motor M to vary according to the detected position of the riser assembly along the length of the column, and thereby can provide a gradual stop and gradual start for passenger comfort.

It is understood that the above description is an example structural construction of facilitating movement of the riser assembly with respect to the lift column. Other structures such as ball screws, rack and pinion gear systems, pneumatic cylinders, hydraulic devices, piston rods, gear chain, electrically driven linear actuators and the like are fully contemplated herein. For example, U.S. Pat. No. 9,161,871 entitled "Multiple Function Patient Handling Devices and Methods" assigned to Community Products, LLC and incorporated herein by reference in its entirety, discusses a suitable linear actuator system that can be used with the disclosed subject matter such as an LA31 linear actuator supplied by Linak Inc. of Denmark.

Figure 6:
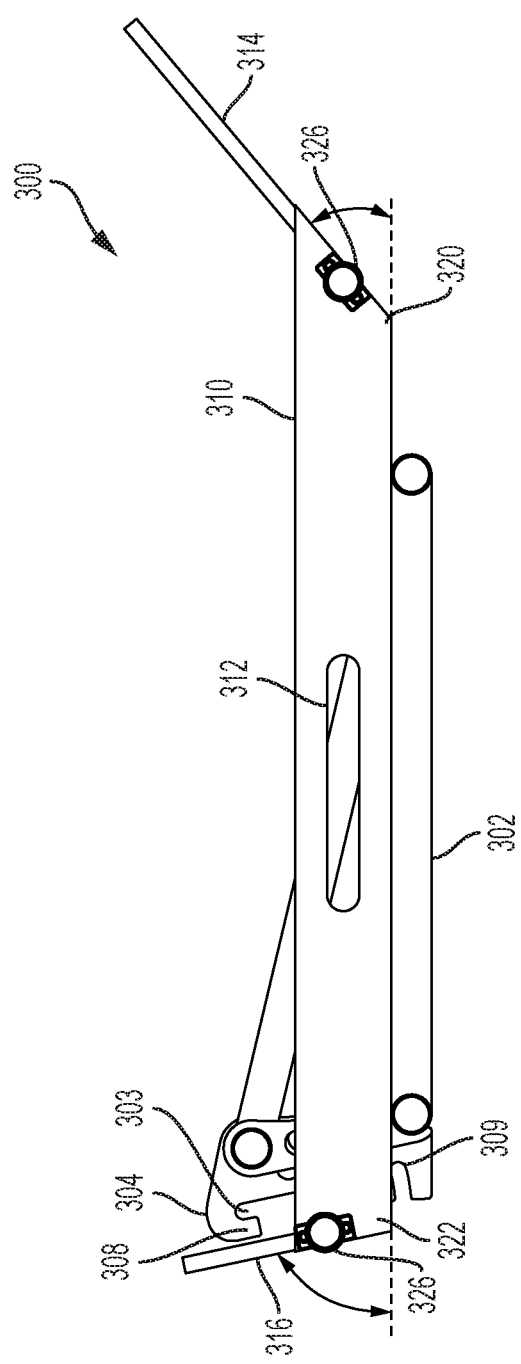
FIG. 6 is a side view of the platform assembly, according to an embodiment of the disclosed subject matter.
Figure 6A:
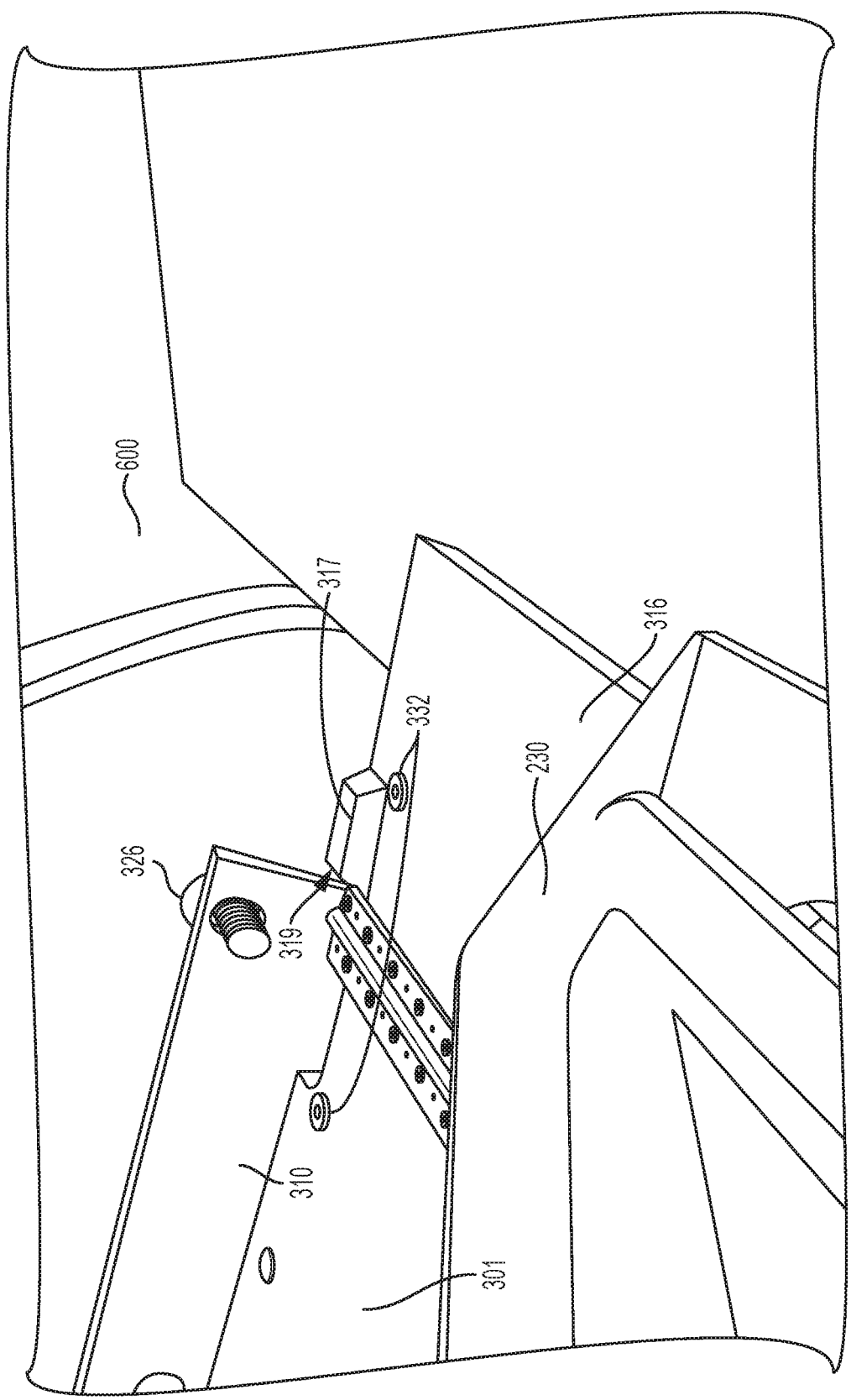
FIG. 6A is a perspective view of the platform assembly, according to an embodiment of the disclosed subject matter.

Solely for purpose of illustration, reference is now made to FIG. 6 and FIG. 6A, which show side views of the platform assembly according to an embodiment of the disclosed subject matter. The platform assembly 300 has a platform structure 302 coupled to at least one platform attachment system 304. The platform attachment system can be any suitable attachment system, such as but not limited to a plate 304. In such embodiment, the at least one platform plate 304 selectively engages the riser attachment device 265 to detachably couple the platform assembly 300 with the riser assembly 260. The at least one platform plate 304 includes a hook structure 308 that defines a slot 303 that is engageable with the first riser pin 268. The at least one platform plate 304 further defines a recess distanced from the hook structure such as an arced slot 309. The arc of the centerline of the arced slot 309 has a radius equal to the distance between the centers of the first and second riser pins 268, 269, and the arc shape of the arced slot 309 is concentric with the first riser pin 268 when the slot defined by the hook structure 308 is fully engaged with the first riser pin 268. As such, the arced slot 309 is engageable with the second riser pin 269. As such, the hook structure 308 and the arced slot 309 are engageable with the first and second riser pins, respectively, to selectively secure the platform assembly 300 with the riser assembly 260. To couple the platform assembly to the riser assembly, the hook structure 308 engages the first riser pin 268. The platform assembly 300 can then rotate around the first riser pin 268 to allow the arced slot 309 to be lowered into engagement with the second riser pin 269. When the platform assembly 300 is coupled to the riser assembly 260, the platform assembly 300 is correspondingly movable with the riser assembly 260.

For purposes of illustration and not limitation, reference is now made to FIG. 1 and FIG. 6 to describe the structure of the platform assembly 300. The platform assembly 300 can include at least one platform plank 301 disposed above the platform structure 302. Although the platform assembly 300 shown in FIG. 1 includes two platform planks 301, the platform assembly can include at least one platform plank or any number of other surfaces or structures of various shapes and/or sizes to accommodate a variety of cargo items or loads. In one embodiment, the at least one platform plank can accommodate a wheelchair or like device. In another embodiment, the platform assembly is outfitted with a cargo roller track surface, to facilitate the movement of palletized cargo upon its surface. In another embodiment, the platform assembly has a flat surface on which persons may stand, and can have a handrail to provide security for such persons as they are lifted in a standing posture. In another embodiment, the platform assembly is outfitted with a device to selectively engage the undercarriage of an accordingly adapted wheelchair. In another embodiment, the platform assembly is outfitted with a chair or seat system to provide for carriage of persons. In a further embodiment, such chair or seat system is collapsible and/or removable. In any embodiment, the platform assembly can include securement devices such as straps, clamps, or other like devices to secure the load for lifting, such as a cargo load or a wheelchair.

The platform assembly 300 can include at least one platform sidewall 310. The platform sidewall can be coupled to the platform plank 301 along a longitudinal length of the platform plank, as shown in FIG. 1 and FIG. 6. The platform assembly 300 of FIG. 1 includes a respective first and second platform sidewall disposed along the longitudinal length of the platform planks, as shown. The platform sidewalls of the platform assembly can include at least one hand-hold device 312 such that the at least one platform sidewall defines the at least one hand-hold device as a respective slot defined therethrough. As shown in FIG. 1, each of the platform sidewalls can include at least one hand-hold device, although any number of hand-hold devices is contemplated herein. In some embodiments of the disclosed subject matter, at least one of the platform sidewalls can include a hand-hold device. The at least one hand-hold device 312 can be used to transport the platform assembly 300 when the lift assembly is not in use or to stow the device. The platform sidewalls can extend up to the full length of the platform planks as shown in FIG. 1, although shorter dimensions are also contemplated herein. The platform sidewalls can be disposed substantially perpendicular with respect to the platform planks, although other angles are contemplated herein. The platform sidewalls can be coupled to the platform planks such that the platform sidewalls and platform planks are stationary with respect to each other. Alternatively, the platform sidewalls can be adjustable with respect to the platform planks. In an embodiment, the platform sidewalls are pivotable relative to the platform planks for collapsibility. In another embodiment, side rails are provided instead of sidewalls, and in an embodiment may be likewise collapsible or removable for stowage.

In an embodiment of the disclosed subject matter, the platform assembly can include at least one front ramp 314 and at least one rear ramp 316. Each of the front ramps and rear ramps can also include at least one cam 317 having a cam recess (not shown) along a side of the cam, as shown in FIG. 6A. The front ramps and the rear ramps 314, 316 can be pivotally coupled to the platform planks represented by the arrows of FIG. 6, such that the angle of the front and rear ramps can be adjusted independently with respect to the platform planks to which they are pivotally coupled.

In an embodiment of the disclosed subject matter as shown in FIG. 6, the front ramp 314 can pivot about the front ramp articulation point 320. Similarly, the rear ramp can pivot about the rear ramp articulation point 322. By pivoting the front ramps downward to rest upon a first surface, such as a foundation, and thereby form a bridge between the first surface and the platform planks, a load to be lifted can be maneuvered into place on the platform planks and can be secured in place prior to the start of the lift. As such, after the lift device is used to raise the load, the load can be unloaded after completion of the lift by properly positioning the rear ramps to likewise rest upon a second surface and thereby form a bridge between the platform planks and the second surface or structure onto which the load is to be transferred. The pivotal connection between the front ramps and the platform planks can be formed by any suitable connection. For example, the front pivotal connection can include a piano hinge or other joint device. Similarly, the rear pivotal connection can be formed by any suitable pivotal connection, such as a piano hinge or other joint device, at the rear ramp articulation point.

As shown in FIG. 1, the platform assembly 300 includes two front ramps and two rear ramps. The respective ramps are movable between an active position and a collapsible position, with a stop position therebetween. Each of the ramps, both front and rear, can be secured in the stop position 324 to secure the cargo on the platform during lifting operations. A variety of biasing mechanisms and systems are envisioned to secure the ramps in these respective positions. These systems include but are not limited to hooks, chains, ropes, lockable gas springs, magnets and cams.

As shown in FIG. 1 and FIG. 6A, the at least one platform sidewall further includes a biasing member 326 and defines a recess to receive the biasing member therethrough. The front ramp and/or rear ramp can further include a cam 317 that defines a cam recess along an exterior side thereof (not shown) to receive the biasing member, and includes a cammed surface 319. When the front or rear ramp is moved toward the stop position from either the collapsible position or the active position, the cammed surface forces the biasing member 326 outward. As such, the front or rear ramp can move between the collapsible position and the active position easily. The front or rear ramp can also be freely moved into the stop position by pausing movement of the ramp from the collapsible position or the active position to allow the biasing member (already withdrawn due to the cammed surface) to engage the cam recess without the biasing member being withdrawn actively by the biasing member knob. As the front or rear ramp enters the stop position, the cam recess aligns with the biasing member, and the biasing member engages the cam recess and is housed therein. The biasing member thus maintains the front or rear ramp in the stop position. The biasing member engages the cam recess to prevent the front or rear ramp from being transitioned to the collapsible position or to the active position. The biasing member is withdrawable from the cam recess to move the front or rear ramp to either the active position or the collapsible position. In one embodiment, the biasing member can be dislodged from the cam recess by withdrawing the biasing member knob outwardly from the platform sidewall. Between the stop position and the collapsible position, the biasing member can further be dislodged from the cam recess by exerting a pressure on the front or rear ramp to engage the biasing member with the cammed surface and transition the ramp to the collapsible position. When the biasing member 326 is withdrawn from the cam recess, the front or rear ramp can be folded outward from the platform planks to the active position for loading or unloading. In order to allow loading and unloading of the platform, the front ramps or rear ramps can be folded out such that the front ramps and the platform planks form up to an approximately 180 degree angle with respect to one another in the active position.

Each biasing member can include a biasing mechanism, such as a spring, such that the member exerts an inward pressure with respect to the cam to secure the ramp. In an embodiment of the disclosed subject matter, each cam surface can be shaped to cooperate with the biasing member to allow the ramp to fold into the collapsible position and lock securely. The cam and the biasing member together provide an easy, fast and safe device to ensure loads remain secured on the lift.

In one embodiment of the disclosed subject matter, the front ramps 316 can be folded in toward the platform planks 301 to the collapsible position for storage of the platform assembly 300 after the platform assembly is removed from the column 200. To secure the platform assembly for storage, a magnet system can be incorporated with the platform assembly. In one embodiment, the magnet system includes magnets 332 disposed on each of the front and rear ramps as well as respectively positioned on each of the platform planks. At least one magnet on each of the platform planks and one magnet on each of the ramps form a magnet pair such that when each of the ramps are folded inward toward its corresponding plank, the magnet pairs attract each other and secure a face of the ramp against a face of the plank. A number of suitable magnet systems are contemplated herein. In another embodiment, a single magnet is positioned on each ramp, front and rear, which is attracted to a ferrous metal fitting correspondingly positioned on the platform that thereby locks the respective ramps in the collapsed position.

In one embodiment of the disclosed subject matter, the platform assembly 300 further includes a platform angle adjustment mechanism to adjust the angle of the platform assembly 300 with respect to the lift column assembly 200. In one embodiment, the platform angle adjustment mechanism comprises a platform angle adjustment knob 334. As shown in the embodiment of FIG. 1, the platform assembly 300 can be coupled to the riser assembly 260. The riser assembly 260 can have a bar 263 that includes a plurality of recesses 336 that can be engaged with the platform angle adjustment knob. The platform angle adjustment knob 334 is insertable into the recesses of the bar to secure a desired angle of the platform assembly 300. The recesses 336 can be vertically aligned along the bar. As such, the platform assembly can be adjustable with respect to the lift column by moving the position of the knob 334 with respect to the recesses 336. By withdrawing the platform angle adjustment knob from one of the recesses and inserting the knob into a different recess 336 defined in a different vertical position in the bar, the angle of the platform assembly can be changed. The platform assembly can pivot about a pivot axis and pin.

In another embodiment as shown in FIG. 5, the platform adjustment knob 334 is coupled to a threaded screw that runs through a nut 335 coupled to the platform assembly. The end of the screw can abut a surface 337 of the riser assembly or can otherwise exert a force against the lift column. By turning the adjustment knob, the screw may be extended or retracted with respect to the platform structure, which can increase or decrease the distance between the lower portion of the platform structure and the riser assembly. By increasing or decreasing the distance between the lower portion of the platform structure and the riser assembly, the platform assembly can pivot with respect to pin 268, enabling adjustment of the platform angle relative to the lift column. The adjustment knob can be turned until the platform assembly is level. In another embodiment, the platform angle adjustment mechanism comprises a cam mechanism. With any embodiment, the platform can be outfitted with an angle indicator, to show an angle of the platform assembly relative to gravity. The angle indicator can be any suitable device, such as but not limited to a level vial or a tilt indicator.

Figure 7:
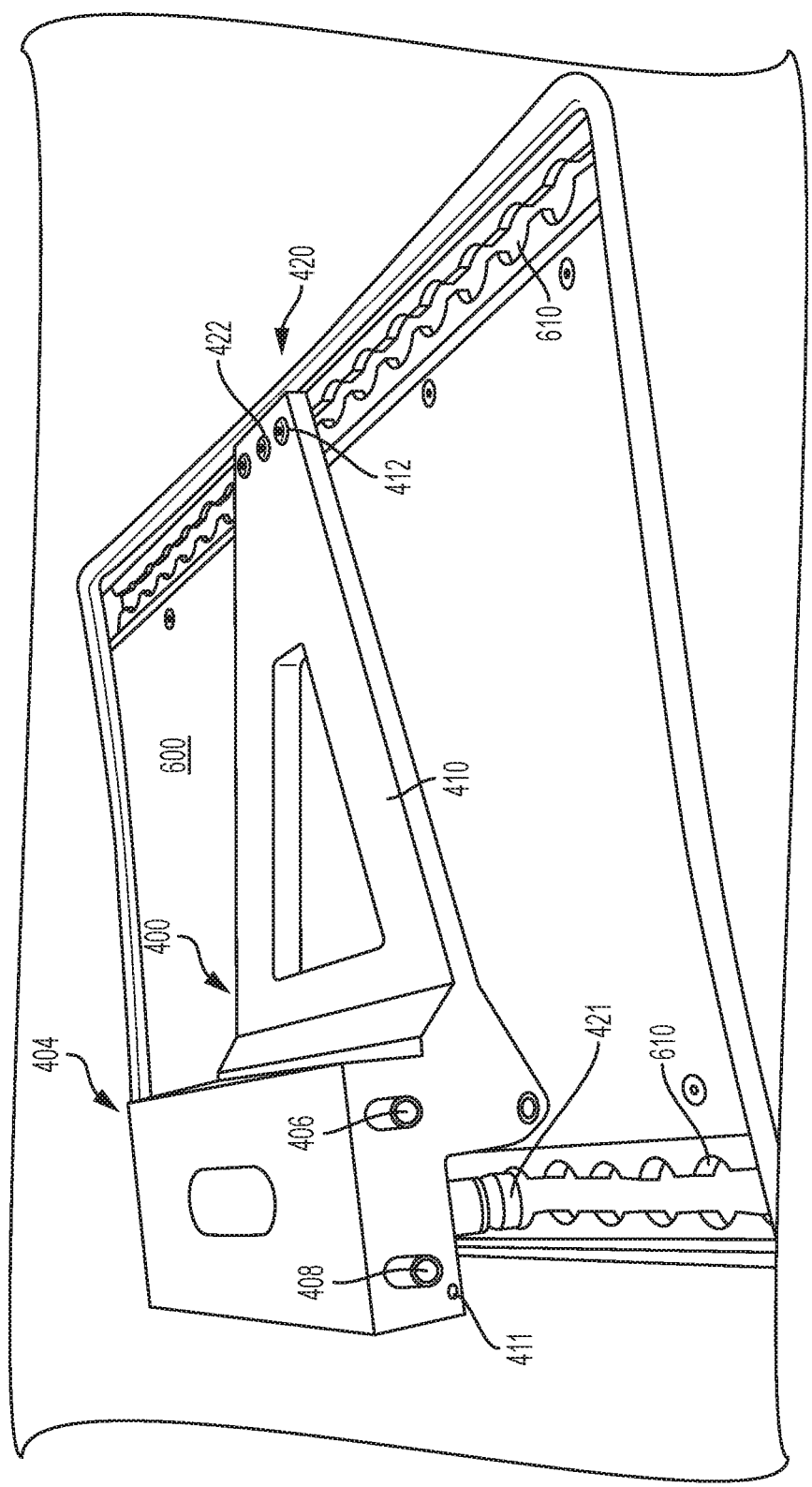
FIG. 7 is a perspective view of the interface assembly, according to an embodiment of the disclosed subject matter.
Figure 7A:
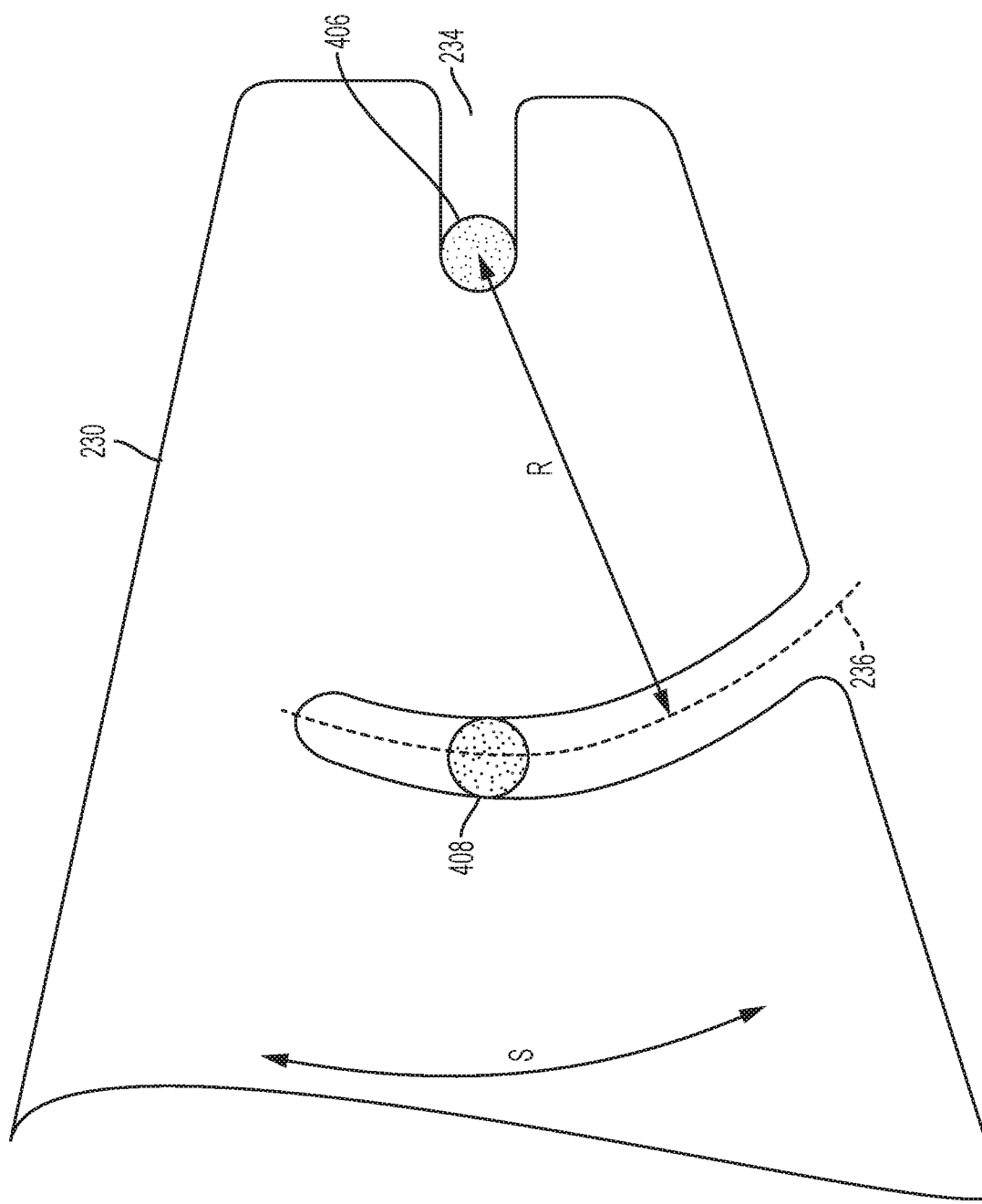
FIG. 7A is a detailed schematic of the lift column assembly coupled with a portion of the interface assembly, according to the disclosed subject matter.

As further discussed above, the interface assembly 400 is detachably coupled with the portable lift column assembly 200, and in particular, can cooperate with the at least one column attachment system 230 to secure the lift column assembly thereto. With reference to FIG. 2, FIG. 5 and FIG. 7, the interface assembly 400 includes a base structure 404 having a support 410 and a base attachment device 420. The base structure 404 includes a first base pin 406 and a second base pin 408 distanced from the first base pin 406. The at least one column attachment system can be any suitable attachment system, such as but not limited to a column attachment plate 230. In such embodiment and as shown in FIG. 7A, the column attachment system comprises a first recess 234. The first recess 234 defines a slot that is engageable with the first base pin 406 of the interface assembly 400. The second recess 236 defines an arced slot that is engageable with the second base pin 408 of the interface assembly. For purposes of illustration, FIG. 7A depicts the column attachment plate 230 coupled with the first base pin 406 and second base pin 408, with the other portions of the interface assembly not shown. In this embodiment, the radius R of the arc of the second recess 236 is equal to the distance between the centers of the first and second base pins 406 and 408, and the arc shape of the second recess 236 is concentric with the pin 406 when the first recess 234 is fully engaged with the first base pin 406.

As shown in the embodiment of FIG. 2, in this embodiment the first recess 234 is oriented along a longitudinal length of the column plate 230, whereas the second recess 236 having an arced slot is oriented at an angle, such as approximately perpendicular, to the longitudinal length of the column plate 230, as shown. To engage the column plate 230 with the interface assembly 400, the pin 406 is engaged by the first recess 234 and then the column plate 230 can rotate around pin 406 in the directions of angle S to allow the second recess 236 to be lowered to engage with the second pin 408. as shown in FIG. 7A. As such, the first and second recesses 234, 236 are engageable with the first base pin 406 and second base pin 408, respectively, to selectively secure the lift column 210 with the interface assembly 400. Furthermore, the base structure 404, together with the support 410 and the base attachment device 420, selectively secures the portable lift device 100 for safe operation thereof.

In one embodiment as depicted in FIG. 7, the support 410 of the interface assembly has a first end 411 and a second end 412. The support 410 is coupled to the base attachment device 420. The base attachment device 420 can include a first assembly 421 coupled to the first end 411 of the support and a second assembly 422 coupled to a second end 412 of the support. The first and second assemblies 421, 422 can respectively include an interlock device that cooperates with any suitable apparatus 600 to which the portable lift device 100 is coupled thereto. In the embodiment of FIG. 7, the apparatus 600 comprises an aircraft plane. The aircraft can include respective tracks 610 that corresponds to the legs of a removable aircraft seat. Once the aircraft seat is removed, the interlock devices of the first and second assemblies 421, 422 can engage the respective tracks 610 to selectively secure the support 410 with the apparatus 600. Accordingly, once the interface assembly is secured, the portable lift device is safely and selectively coupleable with any suitable apparatus. It is understood that the portable lift device can be used with a plurality of suitable apparatuses 600 and the example above with respect to an aircraft plane is provided only for purposes of illustration. Other suitable apparatuses include vehicles, buildings, structures, and any apparatus that requires movement of an object from a first position to a second position above or below the first position. In one embodiment, the apparatus is an aircraft equipped with a cargo door. In one embodiment, the apparatus is a Pilatus aircraft, such as but not limited to a Pilatus PC-12 or PC-24 aircraft. Other apparatuses include but are not limited to Cessna Caravan aircraft, a Quest Kodiak aircraft, or a Dehavilland DHC-6 Twin Otter aircraft. In one embodiment, the base attachment device is fixedly attached to the apparatus, such as at a permanent attachment point of a suitable apparatus. In other embodiments, the column attachment system is coupled directly to an apparatus without the need for an interface assembly. In such embodiments, the column attachment system is coupled to such apparatus by any suitable attachment system, such as but not limited to a hook and latch system. Such hook and latch system can be designed to selectively engage the securement hardware of a cargo door of an aircraft, or any suitable geometry of an aircraft structure. In other embodiments, the column attachment system is coupled to such apparatus by any suitable attachment system, such as but not limited to a pin system, a hinge system, screws, bolts, Velcro, and adhesive. In some embodiments, the column attachment system rests on the apparatus and is held in place by gravity.

In accordance with another aspect of the disclosed subject matter, a method of using a portable lift device assembly is provided. The method comprises, amongst other things, providing a detachable interface assembly including a base structure having a base attachment device; selectively securing the interface assembly to an apparatus by selectively securing the base attachment device; providing a portable column assembly having a lift column including a first end, a second end, and a length therebetween, the second end of the lift column having at least one column attachment system, and a riser assembly coupled to the lift column and movable with respect to the lift column, the riser assembly including a riser attachment device; selectively securing the portable column assembly with the interface assembly, wherein the at least one column attachment system is selectively secured with the base structure; selectively coupling a platform assembly to the riser assembly, wherein the platform assembly is selectively movable with the riser assembly, the platform assembly having a platform structure coupled to at least one platform attachment system, wherein the platform structure maintains structural integrity under a predetermined load capacity, the at least one platform attachment system selectively engages the riser attachment device to detachably couple the platform assembly with the riser assembly; and selectively moving the riser assembly and platform assembly from a first position to a second position.

In accordance with the embodiments of the subject matter previously described, the components of the lift device can be made out of a plurality of suitable materials. For instance, the column assembly 200, the platform assembly 300, and the interface assembly 260 can include aluminum, aluminum alloys or extrusions, other suitable metals, or other high strength alternatives. The threaded rotatable rod 240 can additionally or alternatively include steel. The driver interface nut 244 and the threaded nut assembly 270 can furthermore be bronze. The planks, ramps, and platform sidewalls of the platform assembly can be made of high strength, lightweight material such as, but not limited to wood, fiber glass, carbon fiber, composites, aluminum, plastic and like materials.

As noted above, the portable lift device 100 is portable and easily put together by able adults. The lift device has a light-weight construction. In the embodiment of FIG. 1, the lift device is approximately 50 pounds. In an embodiment, the total weight of the lift device is from approximately 50 pounds to approximately 80 pounds. In another embodiment, the weight of at least one of the column assembly 200 and the platform assembly is less than 50 pounds. In a further embodiment, the weight of at least one of the column assembly 200 and the platform assembly is less than 30 pounds.

The portable lift device can include a number of different safety features, as known in the art. For example, sensors can be implemented on any portion of the device to ensure that the parts of the device are safely coupled together. If a sensor senses an improper coupling, the sensor can output a signal to instruct an individual that the device is not properly coupled. The safety features such as the sensor, can be a component of the motor M or can be a separate feature all together. In one example, the sensor signals a sounding device to alert an individual of incorrect assembly. In one embodiment, a sensor signal can output an alert in the event the column or platform angles respective to gravity or each other exceed a predetermined suitable range.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the device, system, and method of the disclosed subject matter without departing from the spirit or scope of the disclosed subject matter. Thus, it is intended that the disclosed subject matter include modifications and variations that are within the scope of the appended claims and their equivalents.

What is claimed is:

1. A portable lift device comprising:
   a portable column assembly having
      a lift column including a first end, a second end, and a length therebetween, the second end of the lift column having at least one column attachment system;
      a riser assembly coupled to the lift column and movable with respect to the lift column, the riser assembly including a riser attachment device; and
      a platform assembly movable with the riser assembly and having a platform structure coupled to at least one platform attachment system, the at least one platform attachment system detachably coupled to the platform assembly with the riser assembly, wherein the platform structure is capable of maintaining structural integrity under a predetermined load capacity, wherein the portable lift device is capable of moving the platform assembly under the predetermined load capacity from a first position to a second position; and
      a driver interface nut coupled to a threaded rotatable rod extending the length of the lift column,
   wherein the riser assembly includes a chassis having at least one threaded nut assembly defining a recess to receive the threaded rotatable rod,
   wherein engagement of the at least one threaded nut assembly and the threaded rotatable rod is capable of moving the riser assembly with respect to the lift column.

2. The lift device according to claim 1,
   wherein the first end of the lift column includes an adjustment device to permit adjustment of an angle of the lift column,
   wherein the adjustment device includes a roller to facilitate movement of the lift column and adjustment of the angle of the column with respect to an interface assembly.

3. The lift device according to claim 1, further comprising an interface assembly detachably coupled with the at least one column attachment system, the interface assembly including a base structure having a base attachment device,
   wherein the base structure includes a first base pin and a second base pin distanced from the first base pin, the at least one column attachment system includes a plate that defines a first recess engageable with the first base pin and the plate defines a second recess engageable with the second base pin to selectively secure the lift column with the interface assembly.

4. The lift device according to claim 1, wherein the lift column further includes at least one channel extending the length of the lift column,
   wherein the riser assembly further includes at least one guide device housed within the at least one channel to guide the movement of the riser assembly.

5. The lift device according to claim 4, further comprising a motor,
   wherein the motor is capable of driving the driver interface nut to rotate the threaded rotatable rod and to selectively move the riser assembly with respect to the lift column.

6. The lift device according to claim 1, wherein the riser attachment device includes a first riser pin and a second riser pin distanced from the first riser pin and wherein the at least one platform attachment system includes a plate having a hook structure engageable with the first riser pin and the plate defines a recess engageable with the second riser pin to selectively secure the platform assembly with the riser assembly.

7. The lift device according to claim 1, wherein the platform structure further comprises at least one platform sidewall or side rail,
   wherein the platform sidewall or side rail is coupled to the platform plank along a longitudinal length thereof.

8. The lift device according to claim 1, wherein the platform structure further comprises at least one platform plank, and wherein the lift device further comprises a front ramp and a rear ramp,
   wherein the front ramp is pivotally coupled to a front end of the at least one platform plank and the rear ramp is pivotally coupled to a rear end of the at least one platform plank.

9. The lift device according to claim 8, wherein the front ramp further includes a cam that defines a cam recess and includes a cammed surface,
   wherein the lifting device further includes a biasing member insertable into the cam recess to position the front ramp in a stop position and withdrawable from the cam recess to position the front ramp in an active position,
   wherein upon movement of the front ramp from the active position to at least one of the stop position or a collapsible position, the biasing member is configured to engage the cammed surface such that the front ramp is able to move beyond the biasing member, the biasing member further configured to lock the front ramp between the plank and the biasing member.

10. The lift device according to claim 1, further comprising an interface assembly detachably coupled with the at least one column attachment system,
the interface assembly including a base structure having a base attachment device and a support having a first end and a second end, the support is coupled to the base attachment device.

11. The lift device according to claim 1, wherein the lift device is coupleable with an apparatus.

12. The lift device according to claim 11, wherein the apparatus includes at least one of an aircraft, vehicle, and building.

13. The lift device according to claim 11, wherein the column attachment system is coupled to the apparatus by at least one of a pin system, a hinge system, screws, bolts, Velcro, and adhesive.

14. The lift device according to claim 1, wherein the lift device predetermined load capacity comprises up to and including approximately 1500 pounds.

15. The lift device of claim 1, further comprising an interface assembly detachably coupled with the at least one column attachment system, the interface assembly including a base structure having a base attachment device, wherein the base structure is selectively secured to the portable lift device.

16. A method of using a portable lift device assembly comprising:
providing a portable column assembly having
a lift column including a first end, a second end, and a length therebetween, the second end of the lift column having at least one column attachment system,
a riser assembly coupled to the lift column and movable with respect to the lift column, the riser assembly including a riser attachment device,
a driver interface nut coupled to a threaded rotatable rod extending the length of the lift column,
wherein the riser assembly includes a chassis having at least one threaded nut assembly defining a recess to receive the threaded rotatable rod,
wherein engagement of the at least one threaded nut assembly and the threaded rotatable rod is capable of moving the riser assembly with respect to the lift column;
selectively securing the portable column assembly to an apparatus;
selectively coupling a platform assembly to the riser assembly,
wherein the platform assembly is selectively movable with the riser assembly, the platform assembly having a platform structure coupled to at least one platform attachment system,
wherein the platform structure maintains structural integrity under a predetermined load capacity, the at least one platform attachment system selectively engages the riser attachment device to detachably couple the platform assembly with the riser assembly; and
selectively moving the riser assembly and platform assembly between a first position to a second position.

17. A lift device comprising:
a column assembly having
a lift column including a first end, a second end, and a length therebetween, the second end of the lift column having at least one column attachment system;
a riser assembly coupled to the lift column and movable with respect to the lift column, the riser assembly including a riser attachment device; and
a platform assembly movable with the riser assembly and having a platform structure coupled to at least one platform attachment system, the at least one platform attachment system coupled to the platform assembly with the riser assembly, wherein the platform structure is capable of maintaining structural integrity under a predetermined load capacity, wherein the portable lift device is capable of moving the platform assembly under the predetermined load capacity from a first position to a second position; and
an interface assembly coupled with the at least one column attachment system, the interface assembly including a base structure having a base attachment device,
wherein the base structure includes a first base pin and a second base pin distanced from the first base pin, the at least one column attachment system includes a plate that defines a first recess engageable with the first base pin and the plate defines a second recess engageable with the second base pin to selectively secure the lift column with the interface assembly.

18. The lift device according to claim 17, wherein the lift column further includes at least one channel extending the length of the lift column,
wherein the riser assembly further includes at least one guide device housed within the at least one channel to guide the movement of the riser assembly.

19. The lift device according to claim 17, wherein the riser attachment device includes a first riser pin and a second riser pin distanced from the first riser pin and wherein the at least one platform attachment system includes a plate having a hook structure engageable with the first riser pin and the plate defines a recess engageable with the second riser pin to selectively secure the platform assembly with the riser assembly.

20. The lift device according to claim 17, wherein the lift device is coupleable with an apparatus, and wherein the apparatus includes at least one of an aircraft, vehicle, and building.

\* \* \* \* \*